Patented Nov. 30, 1926.

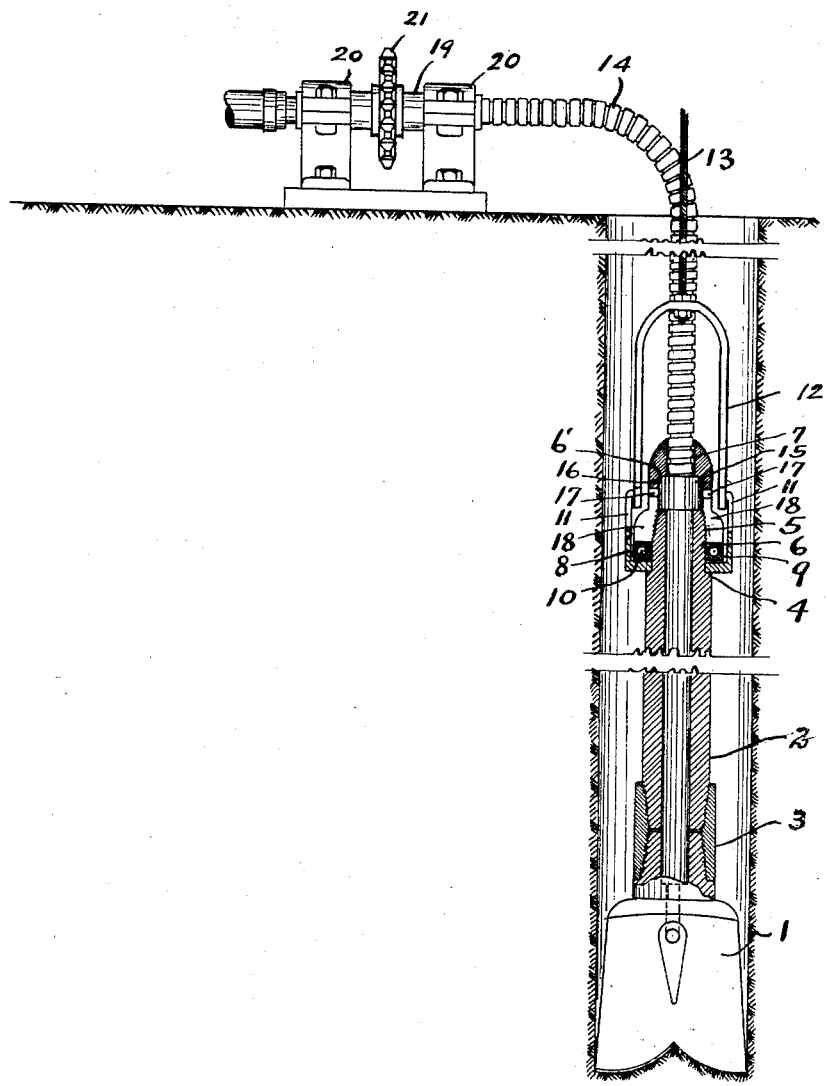

1,608,575

UNITED STATES PATENT OFFICE.

CLYDE E. BANNISTER, OF HOUSTON, TEXAS.

WELL-DRILLING APPARATUS.

Application filed June 26, 1925. Serial No. 39,847.

This invention relates to new and useful improvements in a well drilling apparatus.

One object of the invention is to produce an apparatus of the character described specially designed for the purpose of drilling wells and embodying novel means for driving the drill bit, as well as novel means for suspending the bit in the well bore.

Another object of the invention is to produce an apparatus of the character described embodying a rotatable drilling tool, or bit, and means for suspending the same in the well bore, with a flexible driving shaft, or stem, operatively connected with the drilling tool and through which the latter may be driven, or rotated.

With the above and other objects in view this invention has particular relation to certain novel features of construction, operation and arrangement of parts, an example of which is given in this specification and illustrated in the accompanying drawings, wherein:—

The figure shows a side elevation of the apparatus, partly in section.

Referring now more particularly to the drawings, the numeral 1 designates the drill bit, which may be of any conventional construction, and which is connected to the lower end of the tubular drill pipe 2, by means of the coupling 3. The upper end of the drill pipe 2 is reduced, forming the external annular shoulder 4, and is externally threaded, as at 5, to receive the nut 6 which is threaded thereon, and whose upper end is formed with a central bearing 7. A cup shaped bearing housing 8 is fitted over the upper end of the drill pipe 2 and is seated on the shoulder 4. There is an annular raceway ring 9 located in this housing formed with the usual annular groove to receive the anti-friction bearings 10 which are retained in place by the lower end of the nut 6, which also has an annular groove which coincides with the groove of the ring 9, to receive said bearings.

The housing 8 has the opposing upstanding arms 11, 11 to which the bail 12 is pivotally connected. The apparatus above described is suspended in the bore by means of a cable 13 connected to said bail 12, and may be elevated and lowered by any conventional type of draw works, at the ground surface.

There is a flexible drive stem, or shaft, whose lower end is connected to the head 15 which fits in a socket 16 in the nut 6 and is confined between the upper end of the drill pipe 2 and the opposing inside annular shoulders 6' in the nut 6. This head has the opposing studs 17, 17, which work in the slots 18, 18 of said nut and thereby form a clutch whereby the flexible stem 14 is clutched with the drill pipe.

The upper end of the stem, or, shaft 14 is connected to a horizontal drive shaft 19, mounted in suitable bearings 20, 20, and carrying a fixed sprocket wheel 21 through which power may be applied, through the usual sprocket chain (not shown) from a suitable source of power.

The drill shaft, or stem 14, is tubular and water may be supplied through it, and the drill pipe, to the drill bit, for the usual flushing purposes.

What I claim is:—

1. Well boring apparatus including a drilling tool, suspending means having a swiveling connection with said tool and whereby the tool may be suspended in a well bore, driving means and a continuous flexible driving stem, or shaft, operatively connected with said tool with said means for rotating said stem.

2. Well boring apparatus comprising a drilling tool including a tubular drill pipe, means having a swiveling connection with the pipe and adapted to suspend the tool in a well bore, and a flexible tubular, driving stem operatively connected with the drill pipe extending through said connection to the source of power and adapted to drive said tool, and means through which the stem may be driven.

3. Well boring apparatus comprising a drilling tool including a drill pipe, a nut threaded onto the upper end thereof, a bearing housing, a bearing in said housing adapted to sustain said nut and the drilling tool connected thereto, means connected to said housing and adapted to suspend said tool in a well bore, a flexible driving stem operatively clutched with said nut extending to the surface of the ground and adapted to rotate said tool.

4. Well boring apparatus comprising a drilling tool including a drill pipe, a nut threaded onto the upper end thereof, a bearing housing, a bearing in said housing adapted to sustain said nut, and the drilling tool connected thereto, means connected to said housing and adapted to suspend said tool in a well bore, a flexible driving stem extending from the ground surface to the drilling tool and operatively clutched with said nut and adapted to rotate said tool and means for rotating said stem.

In testimony whereof I have signed my name to this specification.

CLYDE E. BANNISTER.